United States Patent
Liu et al.

(10) Patent No.: US 11,161,246 B2
(45) Date of Patent: Nov. 2, 2021

(54) ROBOT PATH PLANNING METHOD AND APPARATUS AND ROBOT USING THE SAME

(71) Applicant: UBTECH ROBOTICS CORP LTD, Shenzhen (CN)

(72) Inventors: Hongjian Liu, Shenzhen (CN); Zhichao Liu, Shenzhen (CN); Jian Zhang, Shenzhen (CN); Simin Zhang, Shenzhen (CN); Yun Zhao, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 190 days.

(21) Appl. No.: 16/734,402

(22) Filed: Jan. 5, 2020

(65) Prior Publication Data
US 2021/0154835 A1   May 27, 2021

(30) Foreign Application Priority Data
Nov. 21, 2019 (CN) .......................... 201911151039.2

(51) Int. Cl.
*B25J 9/16* (2006.01)

(52) U.S. Cl.
CPC .................... *B25J 9/1664* (2013.01)

(58) Field of Classification Search
CPC ....... B25J 9/1664; G05D 1/0214; G05D 1/02; G01C 21/20; G01C 21/3446
USPC ................................................ 700/245–264
See application file for complete search history.

(56) References Cited

U.S. PATENT DOCUMENTS

| | | | | |
|---|---|---|---|---|
| 5,748,199 A | * | 5/1998 | Palm | H04N 13/133 345/473 |
| 6,167,332 A | * | 12/2000 | Kurtzberg | G05D 1/0274 318/568.12 |
| 6,240,342 B1 | * | 5/2001 | Fiegert | B25J 9/1666 180/169 |
| 6,259,988 B1 | * | 7/2001 | Galkowski | G01C 21/00 340/989 |

(Continued)

FOREIGN PATENT DOCUMENTS

CN    109974702 A    7/2019

OTHER PUBLICATIONS

Shao et al, Cooperative Path Planning for Multiple Robots With Motion Constraints in Obstacle-Strewn Environment, 2019, IEEE, Special Section on Uncertainty Quantification in Robotic Applications, vol. 7, pp. 132286-132301 (Year: 2019).*

(Continued)

*Primary Examiner* — Jaime Figueroa

(57) ABSTRACT

The present disclosure provides a robot path planning method as well as an apparatus and a robot using the same. The method includes: obtaining a grid map and obtaining a position of obstacle and a position of track in the grid map; determining a cost of grids of the grid map based on the position of obstacle and the position of track; generating a grid cost map based on the cost of the grids and the grid map; and planning a global path of the robot from a current position to a destination position based on the grid cost map. In this manner, it effectively integrates free navigation and track navigation, thereby improving the flexibility of obstacle avoidance and ensuring the safety of obstacle avoidance of the robot.

20 Claims, 7 Drawing Sheets

(56) References Cited

U.S. PATENT DOCUMENTS

| | | | | |
|---|---|---|---|---|
| 7,865,267 B2* | 1/2011 | Sabe | ................... | G06K 9/00201 |
| | | | | 700/245 |
| 7,953,551 B2* | 5/2011 | Park | ..................... | G05D 1/0274 |
| | | | | 701/416 |
| 8,280,574 B2* | 10/2012 | Yabushita | ............ | G05D 1/0274 |
| | | | | 701/25 |
| 8,849,559 B2* | 9/2014 | Jeong | ................... | G06T 19/003 |
| | | | | 701/400 |
| 8,861,506 B2* | 10/2014 | Tesov | ................ | G01C 21/3446 |
| | | | | 370/351 |
| 9,104,203 B2* | 8/2015 | Roh | ..................... | G05D 1/0217 |
| 10,394,244 B2* | 8/2019 | Song | ..................... | G01C 21/005 |
| 2005/0131581 A1* | 6/2005 | Sabe | .................... | G05D 1/0274 |
| | | | | 700/245 |
| 2006/0149465 A1* | 7/2006 | Park | ..................... | G05D 1/0217 |
| | | | | 701/416 |
| 2008/0059015 A1* | 3/2008 | Whittaker | .............. | G08G 1/161 |
| | | | | 701/23 |
| 2012/0143372 A1* | 6/2012 | Roh | ..................... | G05D 1/0274 |
| | | | | 700/255 |
| 2017/0344007 A1* | 11/2017 | Song | ..................... | G05D 1/0274 |
| 2019/0113927 A1* | 4/2019 | Englard | ............... | G05D 1/0231 |
| 2019/0163191 A1* | 5/2019 | Sorin | ................... | G05D 1/0088 |
| 2020/0201340 A1* | 6/2020 | Cho | ..................... | G05D 1/0274 |
| 2020/0265248 A1* | 8/2020 | Kwon | ................ | G06K 9/00805 |

OTHER PUBLICATIONS

Thrun et al, Integrating Grid-Based and Topological Maps for Mobile Robot Navigation, 1996, AAAI, Proceedings of the Thirteenth National Conference on Artificial Intelligence AAAI, Portland, Oregon, Aug. 1996, pp. 1-7 (Year: 1996).*

Lee et al, Smooth coverage path planning and control of mobile robots based on high-resolution grid map representation, 2011, Elsevier, Robotics and Autonomous Systems, vol. 59, pp. 801-812 (Year: 2011).*

"Cost Map Improvement Method Based on Typical Grid Map",Jian Zhao, Machinery & Electronics, vol. 36 No. 12, pp. 73-80.

* cited by examiner

ROBOT PATH PLANNING METHOD AND APPARATUS AND ROBOT USING THE SAME

CROSS REFERENCE TO RELATED APPLICATIONS

The present disclosure claims priority to Chinese Patent Application No. 201911151039.2, filed Nov. 21, 2019, which is hereby incorporated by reference herein as if set forth in its entirety.

BACKGROUND

1. Technical Field

The present disclosure relates to path planning technology, and particularly to a robot path planning method as well as an apparatus and a robot using the same.

2. Description of Related Art

Autonomous navigation is one of the core functions necessary for intelligent mobile robots. Path planning is a prerequisite for implementing autonomous navigation. To navigating from the starting point to the end point, a robot needs be able to plan a feasible navigation path in advance. According to different navigation paths, autonomous navigation can be divided into two types, that is, free navigation and track navigation. The free navigation requires that the robot can find an optimal path from the starting point to the end point in all passable areas; and track navigation means that the user has drawn a virtual track on the map in advance, which requires the robot to be capable of finding one optimal track path in all track networks.

In order to make the navigation of the robot both flexible and safe, the two types of navigation of free navigation and track navigation can be merged. For example, when there are no obstacles on the track, the robot walks strictly according to the planned path of the track navigation; when there are obstacles on the track, it switches to the planned path of the free navigation planning path to bypass the obstacle; and after bypassing the obstacles, it switches to the track navigation to continue along the track. However, although the path planning combining two navigation methods can complement each other to a certain extent, the speed jump of the instant when the navigation method is switched will cause the robot to jitter or even stop, the robot will move inconsistently, and the flexibility of the obstacle avoidance will reduce to decrease the safety of the obstacle avoidance.

BRIEF DESCRIPTION OF THE DRAWINGS

In order to more clearly illustrate the technical solutions in the embodiments of the present disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the descriptions of the specification and the claims of the present disclosure, the terms "first", "second", "third", and the like are only used for distinguishing, and cannot be understood as indicating or implying relative importance.

"One embodiment" or "some embodiments" and the like described in the specification of the present disclosure mean that a particular feature, structure, or characteristic which combines the description of the embodiment is included in one or more embodiments of the present disclosure. Thus, the sentences "in one embodiment", "in some embodiments", "in other embodiments", "in the other embodiments" and the like that appear in different places of this specification are not necessarily to refer to the same embodiment, but rather mean "one or more but not all embodiments" unless otherwise specifically emphasized. The terms "including", "comprising", "having" and their variations all mean "including but not limited to" unless otherwise specifically emphasized.

Figure 1:
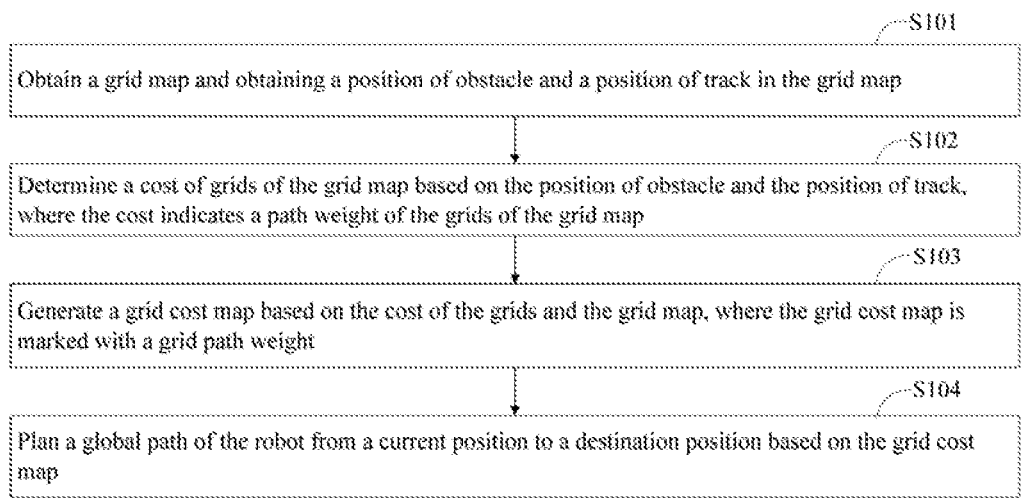
FIG. 1 is a flow chart of a robot path planning method according to an embodiment of the present disclosure.
Figure 6:
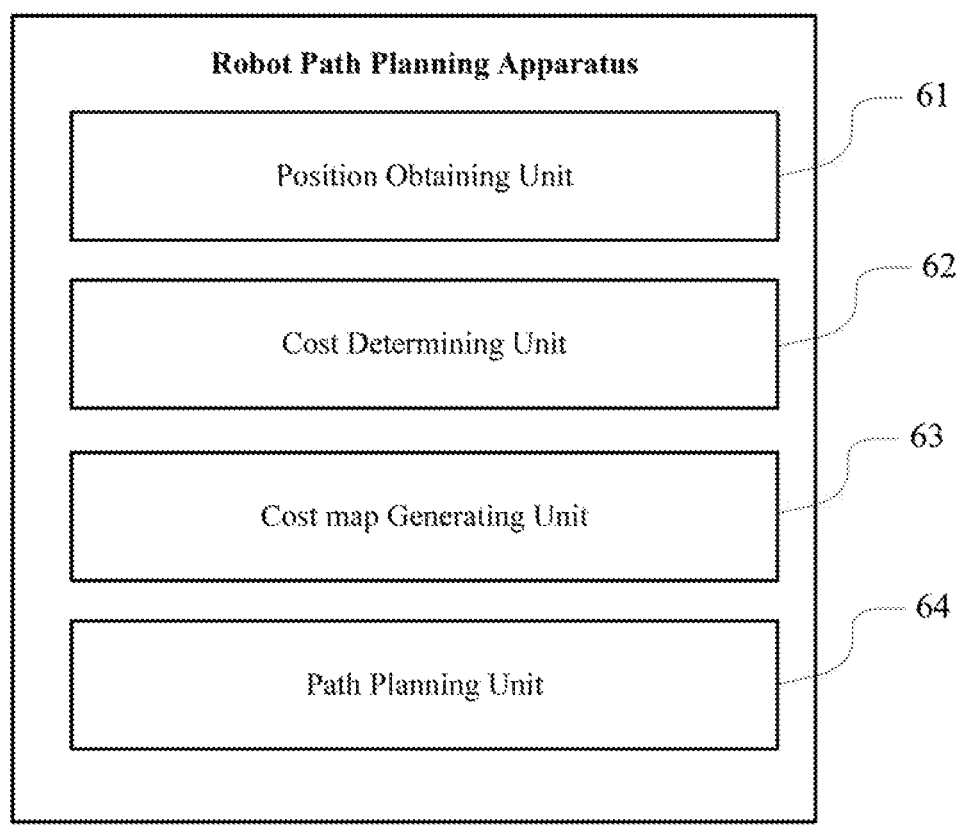
FIG. 6 is a schematic block diagram of a robot path planning apparatus according to an embodiment of the present disclosure.
Figure 7:
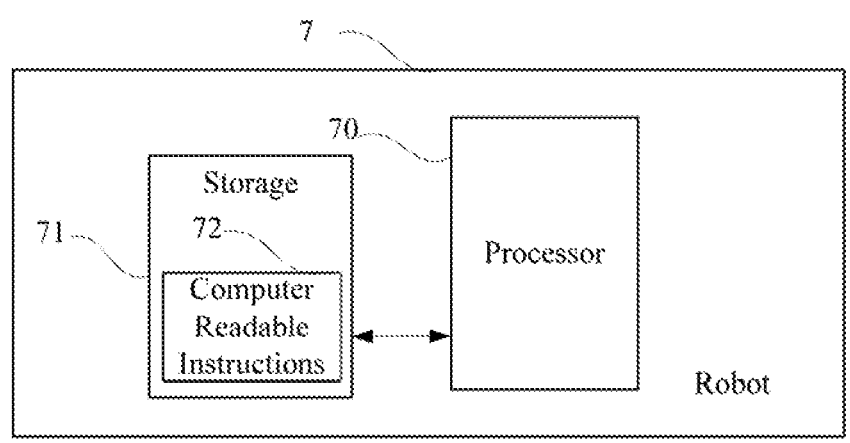
FIG. 7 is a schematic block diagram of a robot according to an embodiment of the present disclosure.

FIG. 1 is a flow chart of a robot path planning method according to an embodiment of the present disclosure. In this embodiment, a path planning method for an intelligent robot is provided, which is for navigating an intelligent robot. The method is a computer-implemented method executable for a processor, which may be implemented through and applied to a path planning apparatus as shown in FIG. 6 or a robot as shown in FIG. 7, or implemented through a computer readable storage medium. As shown in FIG. 1, the method includes the following steps.

S101: obtaining a grid map and obtaining a position of obstacle and a position of track in the grid map.

In robotics, the map to be used can include a feature map, a topological map, a grid map, or the map can be represented by using appearance based methods. In which, the grid map refers to dividing an environment into a series of grids, where each grid is given a probability value representing the probability of the grid being occupied. In this embodiment, before performing a path planning for a robot, a grid map and the position of obstacles and the position of tracks in the grid map are obtained.

In this embodiment, a path planning is performed for the robot by combining free navigation and track navigation. In which, the free navigation means that the robot plans paths in the map by itself based on a current position and a destination position; and the track navigation means that virtual tracks are drawn in the map in advance, and the robot needs to walk on the track when navigating, where the position of the obstacles and the position of the tracks are marked in the grid map.

In one embodiment, the obstacles include static obstacles and dynamic obstacles. In which, the static obstacle refers to obstacles that are permanently added to an environmental map when the map is created, and the dynamic obstacle refers to obstacles that does not appear in the initial environmental map and temporarily appear after refreshing the map. In this embodiment, when there are dynamic obstacles in the grid map, the grid map is dynamically refreshed, that is, the grid map as well as the position of the obstacles and the position of the tracks in the grid map are updated in real time or at a specified period, which confirms the position of the obstacle effectively, thereby improving the effectivity for the obstacle avoidance of the planned path.

S102: determining a cost of grids of the grid map based on the position of obstacle and the position of track, where the cost indicates a path weight of the grids of the grid map.

In this embodiment, the cost of each grid in the grid map is determined based on the position of the obstacle closest to the grid and the position of the track.

Figure 2:
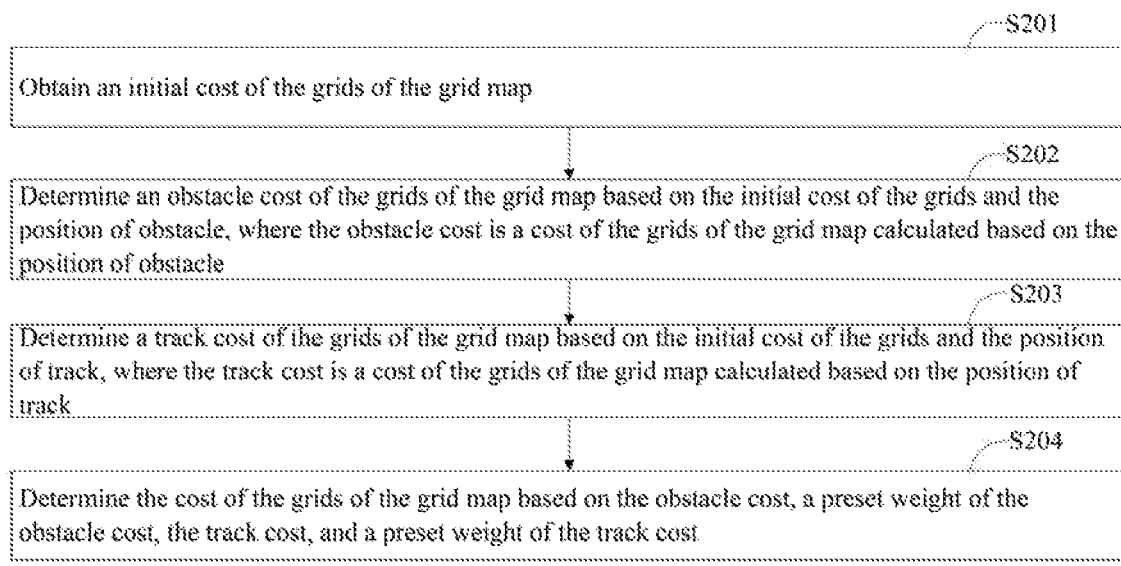
FIG. 2 is a flow chart of step S102 of the robot path planning method of FIG. 1.

FIG. 2 is a flow chart of step S102 of the robot path planning method of FIG. 1. As shown in FIG. 2, in one embodiment, an implementation of determining a grid cost in the robot path planning method of FIG. 1 is as follows:

S201: obtaining an initial cost of the grids of the grid map. Each grid in the grid map is marked with an initial cost.

In this embodiment, the cost of each grid in the grid map is stored with one byte (of unsigned char type). Exemplarily, the range of the value can be represented by one byte is 0-255, where 255 can be used to represent the cost of an unknown area, and 254 can be used to represent the initial cost of the grid.

S202: determining an obstacle cost of the grids of the grid map based on the initial cost of the grids and the position of obstacle, where the obstacle cost is a cost of the grids of the grid map calculated based on the position of obstacle.

In this embodiment, based on the initial cost of the grid and the position of the obstacles, by using a preset cost calculation method, the obstacle cost of the grids of the grid map is determined.

Figure 3:
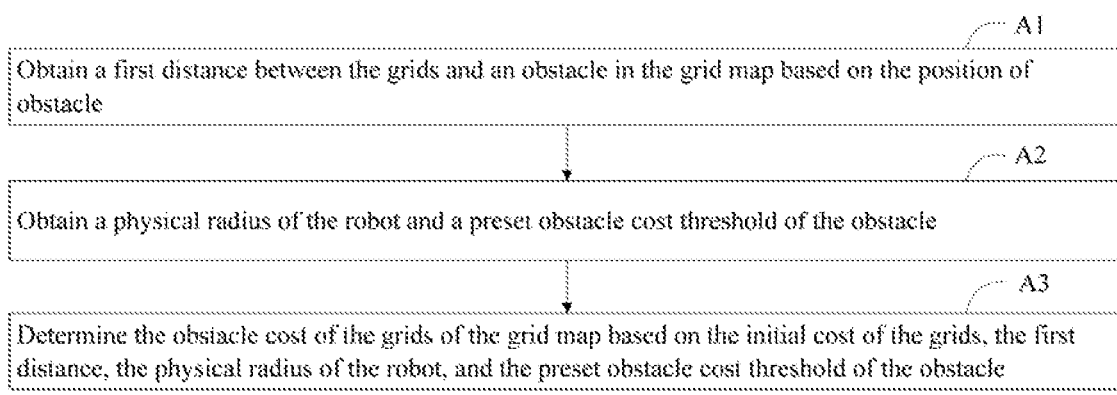
FIG. 3 is a flow chart of step S202 of the robot path planning method of FIG. 1.

FIG. 3 is a flow chart of step S202 of the robot path planning method of FIG. 1. As shown in FIG. 3, in one embodiment, the above-mentioned step S202 includes:

A1: obtaining a first distance between the grids and an obstacle in the grid map based on the position of obstacle. In this embodiment, the grids refer to target grids of the calculation of the cost of the obstacles, and the position of the obstacle closest to each target grid is determined, and the first distance between the target grid and the obstacle in the grid map is obtained based on the position of the obstacle.

A2: obtaining a physical radius of the robot and a preset obstacle cost threshold of the obstacle. In one embodiment, the preset obstacle cost threshold of the obstacle can be obtained through a first cost comparison table created in advance based on the type (or size) of the obstacle. After obtaining the position of the obstacle in the grid map, the type (or size) of the obstacle is determined first, and the preset cost threshold corresponding to the type (or size) of the obstacle is found from the cost comparison table based on the type (or size) of the obstacle.

A3: determining the obstacle cost of the grids of the grid map based on the initial cost of the grids, the first distance, the physical radius of the robot, and the preset obstacle cost threshold of the obstacle.

In this embodiment, the preset obstacle cost threshold of the obstacle includes a first obstacle preset cost threshold and a second obstacle preset cost threshold. The above-mentioned step A3 includes:

determining the obstacle cost of each grid of the grid map based on the following formula (1):

$$\text{Obstacle} - Cost_i = \begin{cases} \varepsilon & (x_i = 0) \\ \delta & (0 < x_i \leq \text{Radius}) \\ b * e^{(-weight*(x_i - Radius))} & (x_i > \text{Radius}) \end{cases} \quad (1)$$

where, Obstacle-cost$_i$ is the obstacle cost of the grid i of the grid map, $x_i$ is the first distance between the grid i and the obstacle, Radius is the physical radius of the robot, $\varepsilon$ is the first obstacle preset cost threshold of the obstacle, $\delta$ is the second obstacle preset cost threshold, b is the initial cost of the grid i, and weight is the adjustment coefficient.

In this embodiment, based on the forgoing formula (1), the obstacle cost of the grids can be determined effectively and quickly. The obstacle cost of the grid gets smaller as the distance from the obstacle increases, and gets larger as the distance from the obstacle decreases until the grid cost on the obstacle with the largest value. The grid i is the target grid of the calculation of the obstacle cost. If the first distance $x_i$ between the grid i and the obstacle is 0, the obstacle cost of the grid i is the first obstacle preset cost threshold $\varepsilon$, where $\varepsilon$ can be 254; if the first distance $x_i$ between the grid i and the obstacle is less than or equal to the physical radius Radius of the robot, the obstacle cost of the grid i is the second obstacle preset cost threshold $\delta$, where $\delta$ can be 253; and the initial cost b of the grid i can be 252, the obstacle cost of the grid i is determined based on $b*e^{(-weight*(x_i - Radius))}$ in the case that the first distance $x_i$ of the grid i and the obstacle is larger than the physical radius Radius of the robot. In this embodiment, the closer the grid i is to the obstacle, the larger the obstacle cost is, while the further away from the obstacle, the lower the obstacle cost is.

S203: determining a track cost of the grids of the grid map based on the initial cost of the grids and the position of track, where the track cost is a cost of the grids of the grid map calculated based on the position of track.

In this embodiment, based on the initial cost of the grids and the position of the track, by using the preset cost calculation method, the track cost of the grids of the grid map is determined.

Figure 4:
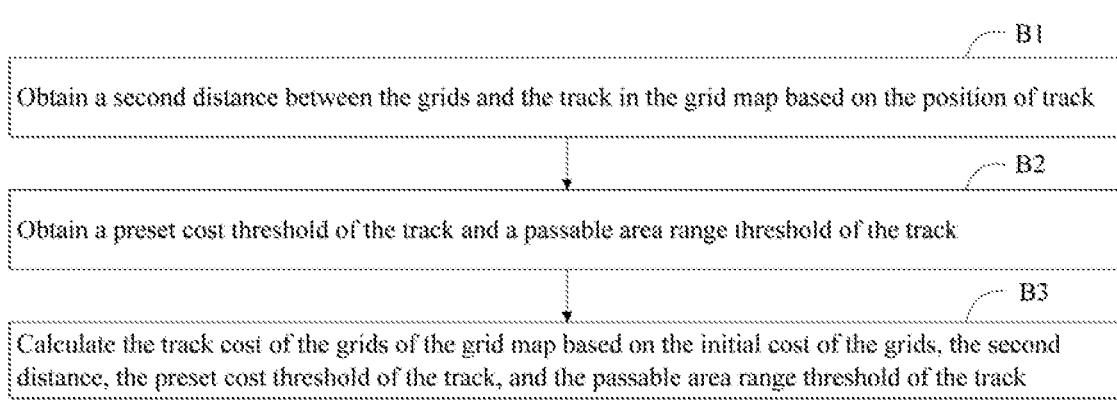
FIG. 4 is a flow chart of step S203 of the robot path planning method of FIG. 1.

FIG. 4 is a flow chart of step S203 of the robot path planning method of FIG. 1. As shown in FIG. 3, in one embodiment, the above-mentioned step S203 includes:

B1: obtaining a second distance between the grids and the track in the grid map based on the position of track. The grid refers to the target grid of the calculation of the track cost. The position of the track closest to the target grid is determined, and the first distance between the target grid and the track in the grid map is obtained based on the position of the track.

B2: obtaining a preset cost threshold of the track and a passable area range threshold of the track. In one embodiment, the preset cost threshold of the track can be obtained through a second cost comparison table created in advance based on a trackable width of the track. After obtaining the position of the tracks in the grid map, the trackable width of the tracks is obtained first, and then the preset cost threshold corresponding to the trackable width of the track is found from the second cost comparison table. The passable area range threshold refers to a distance of the passable area near the track, for example, 1.5 meters, and the area beyond 1.5 meters from the track is set as the impassable area.

B3: calculating the track cost of the grids of the grid map based on the initial cost of the grids, the second distance, the preset cost threshold of the track, and the passable area range threshold of the track.

In this embodiment, the above-mentioned step B3 includes:

determining the track cost of each grid of the grid map based on the following formula (2):

$$\text{Track} - Cost_i = \begin{cases} \tau - (b - \text{weight} \times y_i^p) & (0 < y_i < \lambda) \\ \tau & (y_i \geq \lambda) \end{cases} ; \quad (2)$$

where, Track-cost$_i$ is the track cost of the grid i of the grid map, $y_i$ is the second distance between the grid i and the track, $\tau$ is the preset cost threshold of the track, b is the initial cost of the grid i, $\lambda$ is the passable area range threshold of the track, weight is the adjustment coefficient, and p is a custom parameter indicating the speed of the track cost of the grids that changes as $y_i$ changes.

In this embodiment, the track cost of the grids can be determined effectively and quickly based on the forgoing formula (2). The track cost of the grids increases as the increasing of the distance from the track, and decreases as the decreasing of the distance from the track until the grid cost on the track is the lowest. The grid i is the target grid of the calculation of the track cost. If the second distance $y_i$ between the grid i and the track is larger than or equal to the preset cost threshold $\lambda$ of the track, the track cost of the grid i is the preset cost threshold $\tau$ of the track, where $\tau$ can be 254; and the initial cost b of the grid i can be 252, the track cost of the grid i is determined based on $\tau-(b-\text{weight}\times y_i^p)$ in the case that the distance between the grid i and the track is larger than 0 and less than the preset cost threshold $\lambda$ of the track, where $\lambda$ can be 1.5 meters. In this embodiment, the closer the grid i is to the track, the lower the track cost is, while the further away from the track, the larger the track cost is.

S204: determining the cost of the grids of the grid map based on the obstacle cost, a preset weight of the obstacle cost, the track cost, and a preset weight of the track cost.

In this embodiment, the preset weight of the obstacle cost of the obstacle can be determined based on the number or type of the obstacles appearing in the grid map, and the sum of the preset weight of the obstacle cost and the preset weight of the track cost is 1. In this embodiment, the cost of the grids of the grid map is determined based on the obstacle cost and the preset weight of the obstacle cost, and the track cost and the preset weight of the track cost.

In one embodiment, the above-mentioned step S204 includes:

C1: obtaining a first preset cost threshold and a second preset cost threshold. The first preset cost threshold and the second preset cost threshold are both predefined costs corresponding to the grids under specified conditions. For example, the first preset cost threshold can be 254, and the second preset cost threshold can be 253.

C2: determining the cost of the grids of the grid map based on the following formula (3):

$$Cost_i = \begin{cases} k & (x_i = 0 \text{ or } y_i \geq \lambda) \\ \sigma & (0 < x_i \leq \text{Radius}, 0 \leq y_i < \lambda) \\ \eta * b * e^{(-\text{weight}*(x_i - \text{Radius}))} + \omega * (k - (b - \text{weight}*x_i^p)) & (x_i > \text{Radius}, 0 \leq y_i < \lambda) \end{cases} \quad (3)$$

where, Cost$_i$ is the cost of the grid i of the grid map, $x_i$ is the first distance between the grid i and the obstacle, $y_i$ is the second distance between the grid i and the track, Radius is the physical radius of the robot, $\lambda$ is the passable area range threshold of the track, k is the first preset cost threshold, $\sigma$ is the second preset cost threshold, b is the initial cost of the grid i, weight is the adjustment coefficient, and p is a custom parameter indicating the speed of the track cost of the grids that changes as $y_i$ changes, $\eta$ is the preset weight of the obstacle cost, and $\omega$ is preset weight of the obstacle cost.

In this embodiment, based on the forgoing formula (3), the cost of the grids can be determined effectively and quickly, the costs of the grid are related with the first distance between the grids and the obstacle and the second distance between the grids and the track. The grid i is the target grid of the calculation of the cost. If the first distance between the grid i and the obstacle is $x_i$, or if the second distance $y_i$ between the grid i and the track is larger than or equal to the preset cost threshold $\lambda$ of the track, the cost of the grid i is the first preset cost threshold k, where k can be 254; if the first distance $x_i$ of the grid i and the obstacle is less than or equal to the physical radius Radius of the robot, and the distance between the grid i and the track is larger than 0 and less than the preset cost threshold $\lambda$ of the track, the cost of the grid i is the second preset cost threshold $\sigma$, where $\lambda$ can be 1.5 meters, and the initial cost b of the grid i ca be 252; and in the case that the first distance $x_i$ between the grid i and the obstacle is larger than the physical radius Radius of the robot, and the distance between the grid i and the track is larger than 0 and less than the preset cost threshold λ of the track, the cost of the grid i is determined based on $\eta * b * e^{(-weight*(x_i - Radius))} + \omega*(k-(b-weight*x_i^p))$, where the sum of η and ω is 1, for example, η is ⅔ and ω is ⅓.

S103: generating a grid cost map based on the cost of the grids and the grid map, where the grid cost map is marked with a grid path weight.

In this embodiment, a weighted directed graph is represented through the grid cost map. For example, by calculating the cost of each grid of the grid map and marking the cost for each grid of the grid map, one complete grid cost map can be obtained.

S104: planning a global path of the robot from a current position to a destination position based on the grid cost map.

In this embodiment, in the above-mentioned grid cost map, a path for the robot from the current position to the destination position that has the lowest cost is planed based on the Dijkstra algorithm. Since the farther the distance from the obstacle is, the smaller the cost is, the path must be far away from the obstacle, that is, it has the function of bypassing obstacles; the smaller the distance to the track, the smaller the cost is, and the robot moves via the track as much as possible when there are no obstacles, thereby improving the movement speed of the robot while ensuring high safety.

Figure 5:
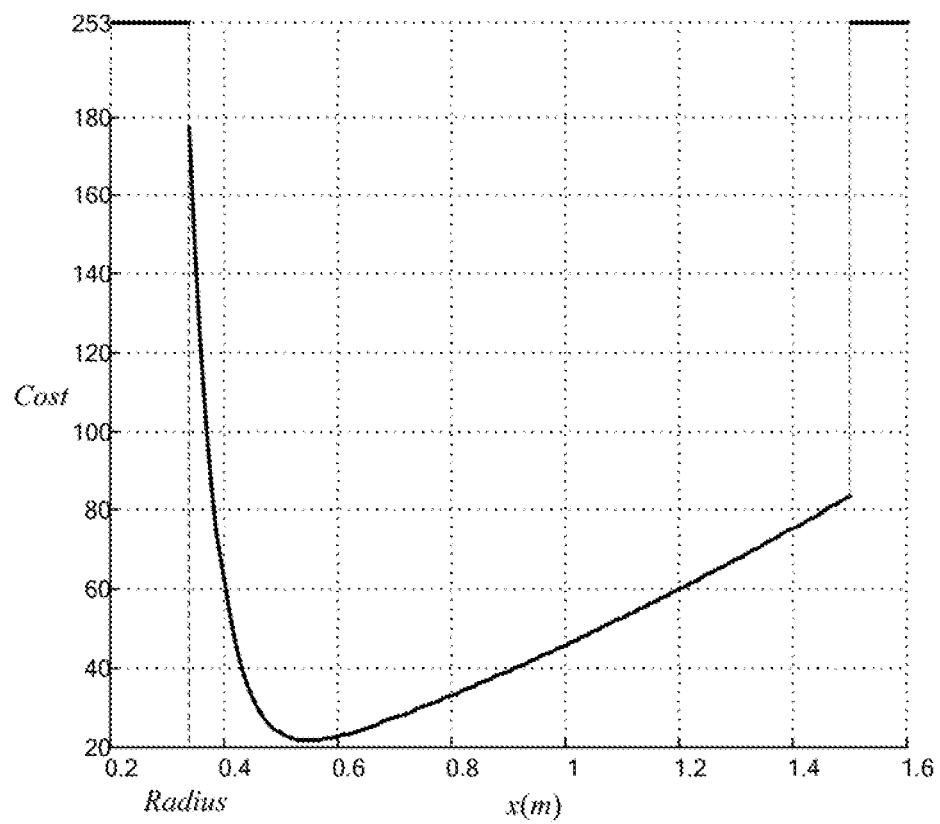
FIG. 5 is a schematic diagram of an example of a change trend of grid cos in the robot path planning method of FIG. 1.

FIG. 5 is a schematic diagram of an example of a change trend of grid costs in the robot path planning method of FIG. 1. As shown in FIG. 5, it shows a change trend of the cost of the surrounding grids when the track is blocked by obstacles. In the interval of (0, 0.5), because it (i.e., the grid) is close to the obstacle, the grid cost is mainly affected by the obstacle, where the more it is close to the obstacle, the higher the cost is, and it can perform the global path planning to be away from the obstacle; and in the interval of (0.5, 1.5), the grid cost is mainly affected by the distance from the track, where the farther away from the track, the higher the cost is, and it can perform the global path planning to get as close as possible to the track. In this embodiment, by combining the above-mentioned free navigation with the track navigation, when there are no obstacles on the track, the robot walks strictly according to the track; and when there are obstacles on the track, the robot will get as close as possible to the track while bypassing the obstacle, and then continue along the track after bypassing the obstacle.

In this embodiment, by obtaining a grid map and obtaining a position of obstacle and a position of track in the grid map; determining a cost of grids of the grid map based on the position of obstacle and the position of track, where the cost indicates a path weight of the grids of the grid map; then generating a grid cost map based on the cost of the grids and the grid map, where the grid cost map is marked with a grid path weight; and eventually planning a global path of the robot from a current position to a destination position based on the grid cost map, it effectively integrates free navigation and track navigation, and the robot can determine whether to use free navigation or track navigation before moving, which can make the robot to move continuously, so as to improve the flexibility of obstacle avoidance and ensure the safety of obstacle avoidance of the robot, thereby improving the effectiveness of navigation.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 6 is a schematic block diagram of a robot path planning apparatus according to an embodiment of the present disclosure. A robot path planning apparatus for a robot is provided, which corresponds to the robot path planning method described in the above embodiment. For convenience of explanation, only parts related to this embodiment are shown.

As shown in FIG. 6, the robot path planning apparatus includes a position obtaining unit 61, a cost determining unit 62, a cost map generating unit 63, and a path planning unit 64, where:

the position obtaining unit 61 is configured to obtain a grid map and obtaining a position of obstacle and a position of track in the grid map;

the cost determining unit 62 is configured to determine a cost of grids of the grid map based on the position of obstacle and the position of track, where the cost indicates a path weight of the grids of the grid map;

the cost map generating unit 63 is configured to generate a grid cost map based on the cost of the grids and the grid map, where the grid cost map is marked with a grid path weight; and the path planning unit 64 is configured to plan a global path of the robot from a current position to a destination position based on the grid cost map.

In one embodiment, the cost determining unit 62 includes:

an initial cost obtaining module configured to obtain an initial cost of the grids of the grid map;

an obstacle cost determining module configured to determine an obstacle cost of the grids of the grid map based on the initial cost of the grids and the position of obstacle, where the obstacle cost is a cost of the grids of the grid map calculated based on the position of obstacle;

a track cost determining module configured to determine a track cost of the grids of the grid map based on the initial cost of the grids and the position of track, where the track cost is a cost of the grids of the grid map calculated based on the position of track; and a grid cost determining module configured to determine the cost of the grids of the grid map based on the obstacle cost, a preset weight of the obstacle cost, the track cost, and a preset weight of the track cost.

In one embodiment, the obstacle cost determining module specifically includes:

a first distance determining submodule configured to obtain a first distance between the grids and an obstacle in the grid map based on the position of obstacle;

a first data obtaining submodule configured to obtain a physical radius of the robot and a preset obstacle cost threshold of the obstacle; and an obstacle cost determining submodule configured to determine the obstacle cost of the grids of the grid map based on the initial cost of the grids, the first distance, the physical radius of the robot, and the preset obstacle cost threshold of the obstacle.

In one embodiment, where the preset obstacle cost threshold of the obstacle includes a first obstacle preset cost threshold and a second obstacle preset cost threshold. The obstacle cost determining submodule includes:

a first cost calculating submodule configured to determine the obstacle cost of each grid of the grid map based on the following formula:

$$\text{Obstacle} - \text{Cost}_i = \begin{cases} \varepsilon & (x_i = 0) \\ \delta & (0 < x_i \leq \text{Radius}) \\ b * e^{(-weight*(x_i - Radius))} & (x_i > \text{Radius}) \end{cases};$$

where, Obstacle-cost$_i$ is the obstacle cost of the grid i of the grid map, $x_i$ is the first distance between the grid i and the obstacle, Radius is the physical radius of the robot, $\varepsilon$ is the first obstacle preset cost threshold of the obstacle, $\delta$ is the second obstacle preset cost threshold, b is the initial cost of the grid i, and weight is the adjustment coefficient.

In one embodiment, the track cost determining module specifically includes:

a second distance determining submodule configured to obtain a second distance between the grids and a track in the grid map based on the position of track;

a second data obtaining submodule configured to obtain a preset cost threshold of the track and a passable area range threshold of the track; and a track cost determining submodule configured to calculate the track cost of the grids of the grid map based on the initial cost of the grids, the second distance, the preset cost threshold of the track, and the passable area range threshold of the track.

In one embodiment, the track cost determining submodule includes:

a second cost calculating submodule configured to determine the track cost of each grid of the grid map based on the following formula:

$$\text{Track} - \text{Cost}_i = \begin{cases} \tau - (b - \text{weight} \times y_i^p) & (0 < y_i < \lambda) \\ \tau & (y_i \geq \lambda) \end{cases};$$

where, Track-cost$_i$ is the track cost of the grid i of the grid map, $y_i$ is the second distance between the grid i and a track, $\tau$ is the preset cost threshold of the track, b is the initial cost of the grid i, $\lambda$ is the passable area range threshold of the track, weight is the adjustment coefficient, and p is a custom parameter indicating the speed of the track cost of the grids that changes as $y_i$ changes.

In one embodiment, the grid cost determining module includes:

a third data obtaining submodule configured to obtain a first preset cost threshold and a second preset cost threshold;

a third cost calculating submodule configured to determine the cost of the grids of the grid map based on the following formula:

$$\text{Cost}_i = \begin{cases} k & (x_i = 0 \text{ or } y_i \geq \lambda) \\ \sigma & (0 < x_i \leq \text{Radius}, 0 \leq y_i < \lambda) \\ \eta * b * e^{(-weight*(x_i - Radius))} + \omega * (k - (b - \text{weight} * x_i^p)) & (x_i > \text{Radius}, 0 \leq y_i < \lambda) \end{cases};$$

where, Cost$_i$ is the cost of the grid i of the grid map, $x_i$ is the first distance between the grid i and an obstacle, $y_i$ is the second distance between the grid i and a track, Radius is the physical radius of the robot, $\lambda$ is the passable area range threshold of the track, k is the first preset cost threshold, $\sigma$ is the second preset cost threshold, b is the initial cost of the grid i, weight is the adjustment coefficient, and p is a custom parameter indicating the speed of the track cost of the grids that changes as $y_i$ changes, $\eta$ is the preset weight of the obstacle cost, and $\omega$ is preset weight of the obstacle cost.

In this embodiment, each of the above-mentioned modules/units is implemented in the form of software, which can be computer program(s) stored in a memory of the robot path planning apparatus and executable on a processor of the robot path planning apparatus. In other embodiments, each of the above-mentioned modules/units may be implemented in the form of hardware (e.g., a circuit of the robot path planning apparatus which is coupled to the processor of the robot path planning apparatus) or a combination of hardware and software (e.g., a circuit with a single chip microcomputer).

In this embodiment, by obtaining a grid map and obtaining a position of obstacle and a position of track in the grid map; determining a cost of grids of the grid map based on the position of obstacle and the position of track, where the cost indicates a path weight of the grids of the grid map; then generating a grid cost map based on the cost of the grids and the grid map, where the grid cost map is marked with a grid path weight; and eventually planning a global path of the robot from a current position to a destination position based on the grid cost map, it effectively integrates free navigation and track navigation, and the robot can determine whether to use free navigation or track navigation before moving, which can make the robot to move continuously, so as to improve the flexibility of obstacle avoidance and ensure the safety of obstacle avoidance of the robot, thereby improving the effectiveness of navigation.

It should be noted that, the information interaction, execution process, and others between the above-mentioned apparatus/units are based on the same concept as the method embodiment of the present disclosure, their functions and technical effects can be found in the method embodiment, and will not be described herein.

In the present disclosure, a computer-readable storage medium is further provided. The above-mentioned computer-readable storage medium stores computer readable instructions, and the steps in any of the robot path planning methods of FIG. 1-FIG. 5 are implemented when the computer readable instructions are executed by a processor.

In the present disclosure, a robot is further provided. The robot includes a storage, a processor, and computer-readable instructions stored in the storage and executable on the processor. The processor implements the steps of any of the robot path planning methods shown in FIG. 1-FIG. 5 of when executing the computer-readable instructions.

In the present disclosure, a computer program product is further provided. When the computer program product is executed on a server, the server is caused to implement the steps of any of the robot path planning methods shown in FIG. 1-FIG. 5.

FIG. 7 is a schematic block diagram of a robot according to an embodiment of the present disclosure. As shown in FIG. 7, in this embodiment, the robot 7 includes a processor 70, a storage 71, and a computer readable instructions 72 stored in the storage 71 and executable on the processor 70. When executing (instructions in) the computer readable instructions 72, the processor 70 implements the steps in the above-mentioned embodiments of the robot path planning method, for example, steps S101-S104 shown in FIG. 1. Alternatively, when the processor 70 executes the (instructions in) computer readable instructions 72, the functions of each module/unit in the above-mentioned device embodiments, for example, the functions of the units 61-64 shown in FIG. 6 are implemented.

Exemplarily, the computer readable instructions 72 may be divided into one or more modules/units, and the one or more modules/units are stored in the storage 71 and executed by the processor 70 to realize the present disclosure. The one or more modules/units may be a series of computer readable instruction sections capable of performing a specific function, and the instruction sections are for describing the execution process of the computer readable instructions 72 in the robot 7.

The robot 7 may be an intelligent robot. The robot 7 may include, but is not limited to, the processor 70 and the storage 71. It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer readable instructions 72 and other programs and data required by the robot 7. The storage 71 may also be used to temporarily store data that has been or will be output.

It should be noted that, the information interaction, execution process, and others between the above-mentioned apparatus/units are based on the same concept as the method embodiment of the present disclosure, their functions and technical effects can be found in the method embodiment, and will not be described herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

When the integrated unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include at least any primitive or device capable of carrying the computer program codes, a recording medium, a computer memory, a read-only memory (ROM), a random access memory (RAM), electric carrier signals, telecommunication signals and software distribution media, for example, a USB flash drive, a portable hard disk, a magnetic disk, an optical disk. In some jurisdictions, in some jurisdictions, according to the legislation and patent practice, a computer readable medium does not include electric carrier signals and telecommunication signals.

In the above-mentioned embodiments, the description of each embodiment has its focuses, and the parts which are not described or mentioned in one embodiment may refer to the related descriptions in other embodiments.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented path planning method for a robot, comprising executing on a processor steps of:
   obtaining a grid map and obtaining a position of obstacle and a position of track in the grid map;
   determining a cost of grids of the grid map based on the position of obstacle and the position of track, wherein the cost indicates a path weight of the grids of the grid map;
   generating a grid cost map based on the cost of the grids and the grid map, wherein the grid cost map is marked with a grid path weight; and
   planning a global path of the robot from a current position to a destination position based on the grid cost map.

2. The method of claim 1, wherein the step of determining the cost of the grids of the grid map based on the position of obstacle and the position of track comprises:
   obtaining an initial cost of the grids of the grid map;
   determining an obstacle cost of the grids of the grid map based on the initial cost of the grids and the position of obstacle, wherein the obstacle cost is a cost of the grids of the grid map calculated based on the position of obstacle;

determining a track cost of the grids of the grid map based on the initial cost of the grids and the position of track, wherein the track cost is a cost of the grids of the grid map calculated based on the position of track; and determining the cost of the grids of the grid map based on the obstacle cost, a preset weight of the obstacle cost, the track cost, and a preset weight of the track cost.

3. The method of claim 2, wherein the step of determining the obstacle cost of the grids of the grid map based on the initial cost of the grids and the position of obstacle comprises:

obtaining a first distance between the grids and an obstacle in the grid map based on the position of obstacle;

obtaining a physical radius of the robot and a preset obstacle cost threshold of the obstacle; and determining the obstacle cost of the grids of the grid map based on the initial cost of the grids, the first distance, the physical radius of the robot, and the preset obstacle cost threshold of the obstacle.

4. The method of claim 3, wherein the preset obstacle cost threshold of the obstacle comprises a first obstacle preset cost threshold and a second obstacle preset cost threshold, and the step of determining the obstacle cost of the grids of the grid map based on the initial cost of the grids, the first distance, the physical radius of the robot, and the preset obstacle cost threshold of the obstacle comprises:

determining the obstacle cost of each grid of the grid map based on the following formula:

$$\text{Obstacle} - Cost_i = \begin{cases} \varepsilon & (x_i = 0) \\ \delta & (0 < x_i \leq \text{Radius}) \\ b * e^{(-weight*(x_i - Radius))} & (x_i > \text{Radius}) \end{cases};$$

where, Obstacle-cost$_i$ is the obstacle cost of the grid i of the grid map, $x_i$ is the first distance between the grid i and the obstacle, Radius is the physical radius of the robot, $\varepsilon$ is the first obstacle preset cost threshold of the obstacle, $\delta$ is the second obstacle preset cost threshold, b is the initial cost of the grid i, and weight is the adjustment coefficient.

5. The method of claim 2, wherein the step of determining the track cost of the grids of the grid map based on the initial cost of the grids and the position of track comprises:

obtaining a second distance between the grids and a track in the grid map based on the position of track;

obtaining a preset cost threshold of the track and a passable area range threshold of the track; and calculating the track cost of the grids of the grid map based on the initial cost of the grids, the second distance, the preset cost threshold of the track, and the passable area range threshold of the track.

6. The method of claim 5, wherein the step of calculating the track cost of the grids of the grid map based on the initial cost of the grids, the second distance, the preset cost threshold of the track, and the passable area range threshold of the track comprises:

determining the track cost of each grid of the grid map based on the following formula:

$$\text{Track} - Cost_i = \begin{cases} \tau - (b - \text{weight} \times y_i^p) & (0 < y_i < \lambda) \\ \tau & (y_i \geq \lambda) \end{cases};$$

where, Track-cost$_i$ is the track cost of the grid i of the grid map, $y_i$ is the second distance between the grid i and a track, $\tau$ is the preset cost threshold of the track, b is the initial cost of the grid i, $\lambda$ is the passable area range threshold of the track, weight is the adjustment coefficient, and p is a custom parameter indicating the speed of the track cost of the grids that changes as $y_i$ changes.

7. The method of claim 2, wherein the step of determining the cost of the grids of the grid map based on the obstacle cost, the preset weight of the obstacle cost, the track cost, and preset weight of the obstacle cost comprises:

obtaining a first preset cost threshold and a second preset cost threshold;

determining the cost of the grids of the grid map based on the following formula:

$$Cost_i = \begin{cases} k & (x_i = 0 \text{ or } y_i \geq \lambda) \\ \sigma & (0 < x_i \leq \text{Radius}, 0 \leq y_i < \lambda) \\ \eta * b * e^{(-weight*(x_i - Radius))} + \omega * (k - (b - \text{weight} * x_i^p)) & (x_i > \text{Radius}, 0 \leq y_i < \lambda) \end{cases};$$

where, Cost$_i$ is the cost of the grid i of the grid map, $x_i$ is the first distance between the grid i and an obstacle, $y_i$ is the second distance between the grid i and a track, Radius is the physical radius of the robot, $\lambda$ is the passable area range threshold of the track, k is the first preset cost threshold, $\sigma$ is the second preset cost threshold, b is the initial cost of the grid i, weight is the adjustment coefficient, and p is a custom parameter indicating the speed of the track cost of the grids that changes as $y_i$ changes, $\eta$ is the preset weight of the obstacle cost, and $\omega$ is preset weight of the obstacle cost.

8. A path planning apparatus for a robot, comprising:

a position obtaining unit configured to obtain a grid map and obtaining a position of obstacle and a position of track in the grid map;

a cost determining unit configured to determine a cost of grids of the grid map based on the position of obstacle and the position of track, wherein the cost indicates a path weight of the grids of the grid map;

a cost map generating unit configured to generate a grid cost map based on the cost of the grids and the grid map, wherein the grid cost map is marked with a grid path weight; and a path planning unit configured to plan a global path of the robot from a current position to a destination position based on the grid cost map.

9. The apparatus of claim 8, wherein the cost determining unit comprises:

an initial cost obtaining module configured to obtain an initial cost of the grids in of the grid map;

an obstacle cost determining module is configured to determine an obstacle cost of the grids in of the grid map based on the initial cost of the grids and the position of obstacle, where the obstacle cost is a cost of the grids of in the grid map calculated based on the position of obstacle;

a track cost determining module is configured to determine a track cost of the grids in of the grid map based on the initial cost of the grids and the position of track, where the track cost is a cost of the grids of in the grid map calculated based on the position of track; and a grid cost determining module configured to determine the cost of the grids of in the grid map based on the obstacle cost, a preset weight of the obstacle cost, the track cost, and a preset weight of the track cost.

10. The apparatus of claim 9, wherein the obstacle cost determining module comprises:

a first distance determining submodule configured to obtain a first distance between the grids and an obstacle in the grid map based on the position of obstacle;

a first data obtaining submodule configured to obtain a physical radius of the robot and a preset obstacle cost threshold of the obstacle; and an obstacle cost determining submodule configured to determine the obstacle cost of the grids in of the grid map based on the initial cost of the grids, the first distance, the physical radius of the robot, and the preset obstacle cost threshold of the obstacle.

11. The apparatus of claim 10, wherein the preset obstacle cost threshold of the obstacle includes a first obstacle preset cost threshold and a second obstacle preset cost threshold, and the obstacle cost determining submodule comprises:

a first cost calculating submodule configured to determine the obstacle cost of each grid of the grid map based on the following formula:

$$\text{Obstacle} - Cost_i = \begin{cases} \varepsilon & (x_i = 0) \\ \delta & (0 < x_i \le \text{Radius}) \\ b*e^{(-\text{weight}*(x_i - \text{Radius}))} & (x_i > \text{Radius}) \end{cases};$$

where, Obstacle-$cost_i$ is the obstacle cost of the grid i of the grid map, $x_i$ is the first distance between the grid i and the obstacle, Radius is the physical radius of the robot, $\varepsilon$ is the first obstacle preset cost threshold of the obstacle, $\delta$ is the second obstacle preset cost threshold, b is the initial cost of the grid i, and weight is the adjustment coefficient.

12. The apparatus of claim 9, wherein the track cost determining module comprises:

a second distance determining submodule configured to obtain a second distance between the grids and a track in the grid map based on the position of track;

a second data obtaining submodule configured to obtain a preset cost threshold of the track and a passable area range threshold of the track; and a track cost determining submodule configured to calculate the track cost of the grids in of the grid map based on the initial cost of the grids, the second distance, the preset cost threshold of the track, and the passable area range threshold of the track.

13. The apparatus of claim 12, wherein the track cost determining submodule comprises:

a second cost calculating submodule configured to determine the track cost of each grid of the grid map based on the following formula:

$$\text{Track} - Cost_i = \begin{cases} \tau - (b - \text{weight} \times y_i^p) & (0 < y_i < \lambda) \\ \tau & (y_i \ge \lambda) \end{cases};$$

where, Track-$cost_i$ is the track cost of the grid i of the grid map, $y_i$ is the second distance between the grid i and a track, $\tau$ is the preset cost threshold of the track, b is the initial cost of the grid i, $\lambda$ is the passable area range threshold of the track, weight is the adjustment coefficient, and p is a custom parameter indicating the speed of the track cost of the grids that changes as $y_i$ changes.

14. A robot, comprising:
a memory;
a processor, and
one or more computer programs stored in the memory and executable on the processor, wherein the one or more computer programs comprise:

instructions for obtaining, through the visual sensor, one or more geometric parameters of a target step, wherein the geometric parameters comprise a step width and a step height of the target step;

instructions for determining at least two time-displacement coordinates and a velocity vector corresponding to each time-displacement coordinate based on the geometric parameters;

instructions for generating a motion trajectory by fitting the at least two time-displacement coordinates and the corresponding velocity vectors; and instructions for controlling the feet of the robot to move based on the motion trajectory.

15. The robot of claim 14, wherein the instructions for determining the cost of the grids of the grid map based on the position of obstacle and the position of track comprise:

instructions for obtaining an initial cost of the grids of the grid map;

instructions for determining an obstacle cost of the grids of the grid map based on the initial cost of the grids and the position of obstacle, wherein the obstacle cost is a cost of the grids of the grid map calculated based on the position of obstacle;

instructions for determining a track cost of the grids of the grid map based on the initial cost of the grids and the position of track, wherein the track cost is a cost of the grids of the grid map calculated based on the position of track; and instructions for determining the cost of the grids of the grid map based on the obstacle cost, a preset weight of the obstacle cost, the track cost, and a preset weight of the track cost.

16. The robot of claim 15, wherein the instructions for determining the obstacle cost of the grids of the grid map based on the initial cost of the grids and the position of obstacle comprises:

instructions for obtaining a first distance between the grids and an obstacle in the grid map based on the position of obstacle;

instructions for obtaining a physical radius of the robot and a preset obstacle cost threshold of the obstacle; and instructions for determining the obstacle cost of the grids of the grid map based on the initial cost of the grids, the first distance, the physical radius of the robot, and the preset obstacle cost threshold of the obstacle.

17. The robot of claim 16, wherein the preset obstacle cost threshold of the obstacle comprises a first obstacle preset cost threshold and a second obstacle preset cost threshold, and the instructions for the obstacle cost of the grids of the grid map based on the initial cost of the grids, the first distance, the physical radius of the robot, and the preset obstacle cost threshold of the obstacle comprise:
  instructions for determining the obstacle cost of each grid of the grid map based on the following formula:

$$\text{Obstacle} - Cost_i = \begin{cases} \varepsilon & (x_i = 0) \\ \delta & (0 < x_i \leq \text{Radius}) \\ b * e^{(-weight*(x_i - Radius))} & (x_i > \text{Radius}) \end{cases};$$

where, Obstacle-cost$_i$ is the obstacle cost of the grid i of the grid map, $x_i$ is the first distance between the grid i and the obstacle, Radius is the physical radius of the robot, $\varepsilon$ is the first obstacle preset cost threshold of the obstacle, $\delta$ is the second obstacle preset cost threshold, b is the initial cost of the grid i, and weight is the adjustment coefficient.

18. The robot of claim 15, wherein the instructions for determining the track cost of the grids of the grid map based on the initial cost of the grids and the position of track comprise:
  instructions for obtaining a second distance between the grids and a track in the grid map based on the position of track;
  instructions for obtaining a preset cost threshold of the track and a passable area range threshold of the track; and
  instructions for calculating the track cost of the grids of the grid map based on the initial cost of the grids, the second distance, the preset cost threshold of the track, and the passable area range threshold of the track.

19. The robot of claim 18, wherein the instructions for calculating the track cost of the grids of the grid map based on the initial cost of the grids, the second distance, the preset cost threshold of the track, and the passable area range threshold of the track comprise:
  instructions for determining the track cost of each grid of the grid map based on the following formula:

$$\text{Track} - Cost_i = \begin{cases} \tau - (b - \text{weight} \times y_i^p) & (0 < y_i < \lambda) \\ \tau & (y_i \geq \lambda) \end{cases};$$

where, Track-cost$_i$ is the track cost of the grid i of the grid map, $y_i$ is the second distance between the grid i and a track, $\tau$ is the preset cost threshold of the track, b is the initial cost of the grid i, $\lambda$ is the passable area range threshold of the track, weight is the adjustment coefficient, and p is a custom parameter indicating the speed of the track cost of the grids that changes as $y_i$ changes.

20. The robot of claim 15, wherein the instructions for determining the cost of the grids of the grid map based on the obstacle cost, the preset weight of the obstacle cost, the track cost, and preset weight of the obstacle cost comprise:
  instructions for obtaining a first preset cost threshold and a second preset cost threshold;
  instructions for determining the cost of the grids of the grid map based on the following formula:

$$Cost_i = \begin{cases} k & (x_i = 0 \text{ or } y_i \geq \lambda) \\ \sigma & (0 < x_i \leq \text{Radius}, 0 \leq y_i < \lambda) \\ \eta * b * e^{(-weight*(x_i - Radius))} + \omega * (k - (b - \text{weight} * x_i^p)) & (x_i > \text{Radius}, 0 \leq y_i < \lambda) \end{cases};$$

where, Cost$_i$ is the cost of the grid i of the grid map, $x_i$ is the first distance between the grid i and an obstacle, $y_i$ is the second distance between the grid i and a track, Radius is the physical radius of the robot, $\lambda$ is the passable area range threshold of the track, k is the first preset cost threshold, $\sigma$ is the second preset cost threshold, b is the initial cost of the grid i, weight is the adjustment coefficient, and p is a custom parameter indicating the speed of the track cost of the grids that changes as $y_i$ changes, $\eta$ is the preset weight of the obstacle cost, and $\omega$ is preset weight of the obstacle cost.

* * * * *